(12) United States Patent
Lee et al.

(10) Patent No.: US 6,633,781 B1
(45) Date of Patent: Oct. 14, 2003

(54) HOME APPLIANCE NETWORKING SYSTEM AND METHOD FOR CONTROLLING THE SAME

(75) Inventors: Sang Kyun Lee, Kyungki-do (KR); Ki Tae Oh, Kyungki-do (KR); Yeon Kyoung Lee, Kyungki-do (KR); Chang Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/211,287

(22) Filed: Aug. 5, 2002

(51) Int. Cl.[7] .................. G05B 11/01; G05B 15/00; G06F 15/16
(52) U.S. Cl. ............... 700/19; 700/20; 700/83; 709/202; 709/226
(58) Field of Search .................. 700/19, 20, 83; 709/202, 223, 226, 231, 313

(56) References Cited

U.S. PATENT DOCUMENTS

| | | | | |
|---|---|---|---|---|
| 5,796,607 A | * | 8/1998 | Le Van Suu | 700/11 |
| 6,185,466 B1 | * | 2/2001 | Nicewonger | 700/19 |
| 6,480,753 B1 | * | 11/2002 | Calder et al. | 700/83 |
| 6,502,000 B1 | * | 12/2002 | Arnold et al. | 700/83 |
| 2002/0026533 A1 | * | 2/2002 | Dutta et al. | 709/313 |
| 2002/0188663 A1 | * | 12/2002 | Islam et al. | 709/202 |
| 2003/0009515 A1 | * | 1/2003 | Lee et al. | 709/202 |
| 2003/0037166 A1 | * | 2/2003 | Ueno et al. | 709/238 |

* cited by examiner

*Primary Examiner*—Albert W. Paladini
*Assistant Examiner*—Douglas S. Lee
(74) *Attorney, Agent, or Firm*—Greenblum & Bernstein, P.L.C.

(57) ABSTRACT

A home appliance networking system and a method for controlling the same. The home appliance networking system includes a plurality of passive home appliances controlled according to control commands sent over an internal network constructed for a home networking system, and a plurality of active home appliances for transmitting the control commands for the passive home appliances to the internal network. The plurality of active home appliances transmit different control commands each assigned a unique number to a specific one of the plurality of passive home appliances. The specific passive home appliance is controlled according to only a latest one of the input control commands.

15 Claims, 3 Drawing Sheets

HOME APPLIANCE NETWORKING SYSTEM AND METHOD FOR CONTROLLING THE SAME

BACKGROUND OF THE INVENTION

1. Field of the Invention

The present invention relates to a home appliance networking system and method for controlling the same. More particularly the present invention relates to a home appliance networking system and a method for controlling the same, wherein, when a plurality of control commands are inputted to a specific one of a plurality of home appliances of a home networking system, the specific home appliance is controlled according to a latest one of the input control commands.

2. Description of the Related Art

A home networking system has recently become increasingly widely spread in which a network is constructed to transmit and receive data to/from a plurality of home appliances installed in a home or building and the plurality of home appliances are connected to the constructed network to be interoperable with one another.

Particularly, in a home appliance networking system, a user can not only recognize state (status or condition) information of a specific home appliance from any place inside of a home, but can also control the specific home appliance using a control system, such as a computer, from any place outside of the home. In this regard, the home appliance networking system has obtained favorable responses from many consumers, and has thus become more widespread in its application on an almost daily basis.

In order to construct the home appliance networking system as mentioned above, generally, an internal network composed of a power line or local area network (LAN) line is constructed in a home or building and a plurality of home appliances are connected to the constructed internal network to transmit and receive data to/from one another.

The plurality of home appliances connected to the internal network may generally be classified into an active type, such as an audio receiver, capable of transmitting control commands to other home appliances, and a passive type, such as a speaker, capable of being controlled according to a control command transmitted from an active home appliance.

However, an existing home appliance networking system including a plurality of active home appliances and a plurality of passive home appliances as stated above has a disadvantage in that, when the plurality of active home appliances input control commands into a specific one of the plurality of passive home appliances, the specific passive home appliance may be erroneously controlled.

In other words, as shown in FIG. 1, in the case where a user inputs a first control command through a first active home appliance A1 to set the level of water of a first passive home appliance P1, for example, a washing machine to 'high', the input first control command may not be transmitted to the first passive home appliance P1 due to a network error (1). If the first control command is not transmitted to the first passive home appliance P1, the user may input a second control command through a second active home appliance A2 to set the water level of the first passive home appliance P1 to 'medium', and the input second control command may be transmitted to the first passive home appliance P1 (2). Upon receiving the second control command, the first passive home appliance is controlled according to the received second control command and then transmits an acknowledgement signal ACK to the second active home appliance (3).

At this time, the first active home appliance A1 may re-transmit the 'high' control command to the first passive home appliance P1 because of its reception of no ACK signal therefrom in responsive to the 'high' control command (4). Upon receiving the re-transmitted 'high' control command, the first passive home appliance P1 sets the water level to 'high ' contrary to the user's intention and then transmits the resulting ACK signal to the first active home appliance A1 (5). As a result, the first passive home appliance performs a erroneous operation contrary to the user's intention.

SUMMARY OF THE INVENTION

Therefore, the present invention has been made in view of the above problems, and it is an object of the present invention to provide a home appliance networking system and a method for controlling the same, wherein, when a plurality of control commands are input to an internal network for a home networking system through a plurality of active home appliances, an associated passive home appliance is controlled according to a latest input one of the control commands.

In accordance with one aspect of the present invention, the above and other objects can be accomplished by the provision of a home appliance networking system comprising: at least one passive home appliance associated with an identifying number assigned to a control command received over an internal network constructed for a home networking system. The passive home appliance is controlled according to the received control command on the basis of the identified number and sends notification information to the internal network to notify the internal network that it has been controlled according to the control command. The invention also includes at least one active home appliance that increases a number to be assigned to a control command to be transmitted to the passive home appliance in response to the notification information sent from the passive home appliance, assigns the increased number to the control command to be transmitted to the passive home appliance and transmits the resulting control command to the passive home appliance.

In accordance with another aspect of the present invention, there is provided a method for controlling a home appliance networking system, comprising assigning, by an active home appliance, a number to a home appliance control command to be sent to an internal network of a home networking system, sending, by the active home appliance, the number-assigned control command to the internal network, identifying a passive home appliance, controllable according to the control command sent by the number assigned to the sent control command, determining, by the passive home appliance, based on the identified number whether the passive home appliance will be controlled according to the sent control command, controlling the passive home appliance according to the sent control command if it is determined that the passive home appliance will be controlled according to the sent control command, sending by the passive home appliance, notification information to the internal network to notify the internal network that the passive home appliance has been controlled according to the sent control command.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
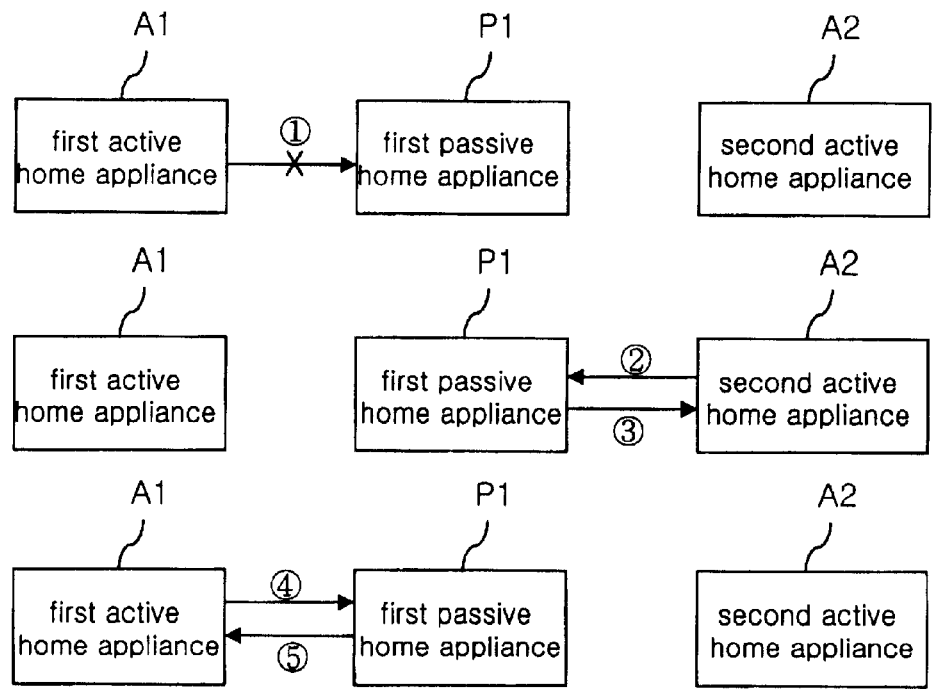
FIG. 1 is a block diagram showing an example of the case where control commands are input through a plurality of active home appliances in a conventional home appliance networking system.
Figure 2:
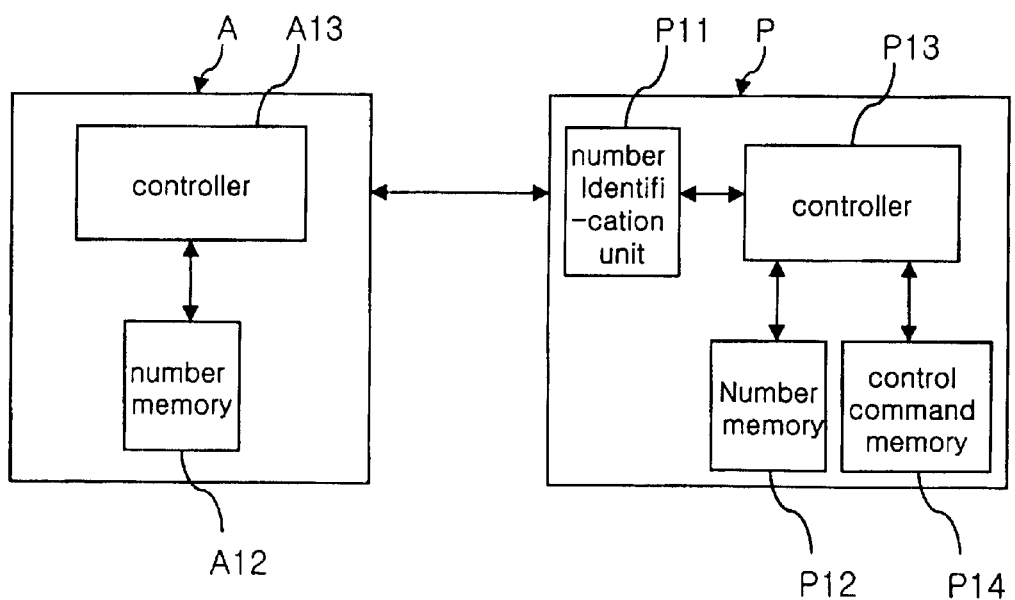
FIG. 2 is a block diagram showing the construction of a home appliance networking system in accordance with the present invention.

With reference to FIG. 2, there is shown, in block form, the construction of a home appliance networking system in accordance with the present invention. As shown in this drawing, the home appliance networking system comprises at least one passive home appliance P for transmitting and receiving data to/from an internal network of a home networking system constructed in a home or building. The passive home appliance P is controlled according to a control command received over the internal network. The home appliance networking system further comprises at least one active home appliance A for sending the control command for the passive home appliance P to the internal network.

The passive home appliance P includes a number identification unit P11 for identifying a number assigned to a control command currently sent over the internal network, a number memory P12 for storing a largest one of the numbers assigned to a plurality of previous control commands sent over the internal network, and a controller P13 for controlling the passive home appliance P in response to the current control command if the number identified by the number identification unit P11 is larger than the number stored in the number memory P12, and then storing the number assigned to the current control command in the number memory P12.

Preferably, the number identification unit P11 identifies a number assigned to each control command sent over the internal network by analyzing a header of a data packet of each control command. The header of the data packet of each control command contains any one of a number 1 to a number 254. Further, a later sent control command is assigned a larger number than that of an earlier sent control command.

In this regard, the controller P13 compares a number contained in a header of a current control command sent over the internal network with a largest one of numbers assigned to a plurality of previous control commands sent over the internal network, stored in the number memory P12, and then controls the passive home appliance P in response to the current control command if the number assigned to the current control command is larger than the number stored in the number memory P12.

Further, the controller P13 transmits an acknowledgement signal ACK to an active home appliance associated with the current control command after controlling the passive home appliance P in response to the current control command. Furthermore, the controller P13 sends notification information to the internal network to notify (i.e. indicate) that the passive home appliance P has been controlled according to the current control command.

According to the present invention, the passive home appliance P further includes a control command memory P14 for storing a control command sent over the internal network. The control command stored in the control command memory P14 has a largest one of numbers assigned to existing control commands sent over the internal network.

The controller P13 compares the current control command with the control command stored in the control command memory P14 to determine whether they are the same. If the current control command is determined to be the same as the control command stored in the control command memory P14, the controller P13 discards the current control command and transmits an ACK signal to an active home appliance associated with the current control command. That is, in the case where the same control commands are input through a plurality of active home appliances, a corresponding passive home appliance need not generate and send new notification information associated with each of the control commands.

On the other hand, the assignment of '0', not a number from 1 to 254, to a header of a data packet signifies that the data packet contains notification information causing no duplication. Alternatively, the assignment of '255' to a header of a data packet signifies that the data packet is not for controlling one passive home appliance, but for controlling all passive home appliances connected to the internal network.

In this connection, upon receiving a data packet of a header assigned the number '255', all passive home appliances connected to the internal network are controlled according to the received data packet.

According to the present invention, the active home appliance A includes a number memory A12 for storing a number to be assigned to a control command input by a user, and a controller A13 for increasing the number stored in the number memory A12 upon receiving the notification information sent from the passive home appliance P. The controller A13 then assigns the increased number to the input control command and transmits the resulting control command to the passive home appliance P.

Namely, the controller A13 assigns the number stored in the number memory A12 to the control command input by the user and transmits the resulting control command to a corresponding passive home appliance connected to the internal network.

At this time, the controller A13 of the active home appliance A may transmit a number request command to the passive home appliance P in order to recognize the number stored in the number memory P12 of the passive home appliance P, set a number to be assigned to the control command input by the user on the basis of the recognized number and store the set number in the number memory A12.

Upon receiving the number request command transmitted from the controller A13 of the active home appliance A, the controller P13 of the passive home appliance P transmits the number stored in the number memory P12 to the active home appliance A. Then, the controller A13 of the active home appliance sets a number to be assigned to the control command input by the user on the basis of the number transmitted from the passive home appliance P and stores the set number in the number memory A12 of the active home appliance A.

Figure 3:
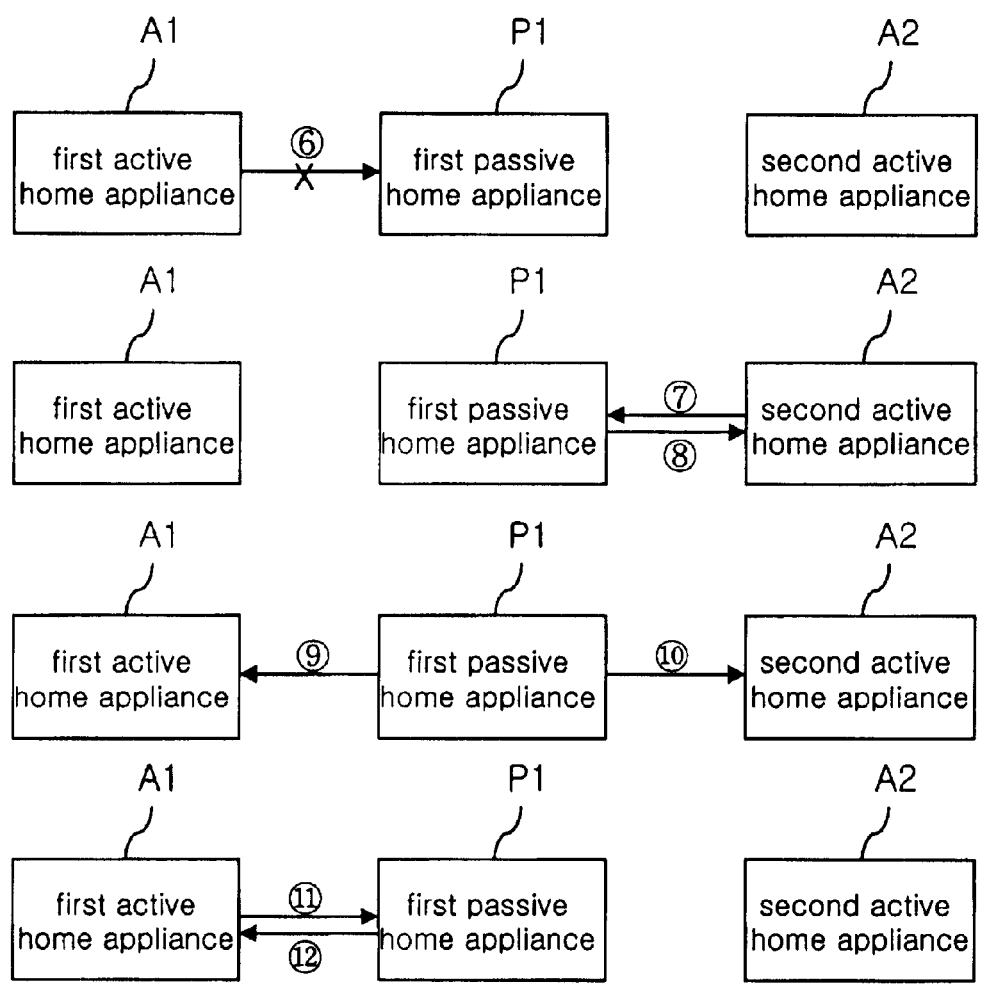
FIG. 3 is a block diagram showing an example of the case where control commands are input through a plurality of active home appliances in the home appliance networking system in accordance with the present invention.

FIG. 3 shows an example of the case where control commands are input through a plurality of active home appliances in the home appliance networking system in accordance with the present invention.

As shown in FIG. 3, in the case where the user inputs a first control command through a first active home appliance A1 to set the level of water of a first passive home appliance P1, for example, a washing machine to 'high', the first active home appliance A1 attempts to transmit the input first control command to the first passive home appliance P1 (6). At this time, the first control command from the first active home appliance A1 may not be transmitted to the first passive home appliance P1 due to an error on the internal network.

Under the condition that the first control command is not transmitted to the first passive home appliance P1, the user may move to a place where a second active home appliance A2 is located and input a second control command through the second active home appliance A2 to set the water level of the first passive home appliance P1 to 'medium'. If the user inputs the second control command to set the water level of the first passive home appliance P1 to 'medium', then the second active home appliance A2 transmits the input second control command to the first passive home appliance P1 (7). Upon receiving the second control command transmitted from the second active home appliance A2, the first passive home appliance P1 sets the water level to 'medium' and then transmits an acknowledgement signal ACK to the second active home appliance A2 (8).

Thereafter, the first passive home appliance P1 sends notification information to the internal network to notify the internal network that it has been controlled according to the current control command (9 and 10). Preferably, the notification information includes a number obtained by adding '1' to a number assigned to the current control command, identified by a number identification unit of the first passive home appliance P1.

The first active home appliance A1 may thereafter re-transmit the 'high' control command to the first passive home appliance P1 because of its non-reception of an ACK signal therefrom.

Upon receiving the 'high' control command re-transmitted from the first active home appliance A1, the first passive home appliance P1 is not controlled according to the received 'high' control command because a number assigned to the retransmitted control command is smaller than that stored in a number memory P12 of the first passive home appliance P1. As a result, the first passive home appliance P1 transmits a negative acknowledgement signal NAK to the first active home appliance A1 to notify the first active home appliance A1 that it has not been controlled according to the 'high' control command.

In this manner, the passive home appliance is controlled according to a latest control command input by the user.

Provided that the first and second active home appliances A1 and A2 transmit the same control commands, the first passive home appliance P1 is controlled according to an earlier one of the input control commands and then transmits an ACK signal to one of the active home appliances associated with the later input control command.

Figure 4:
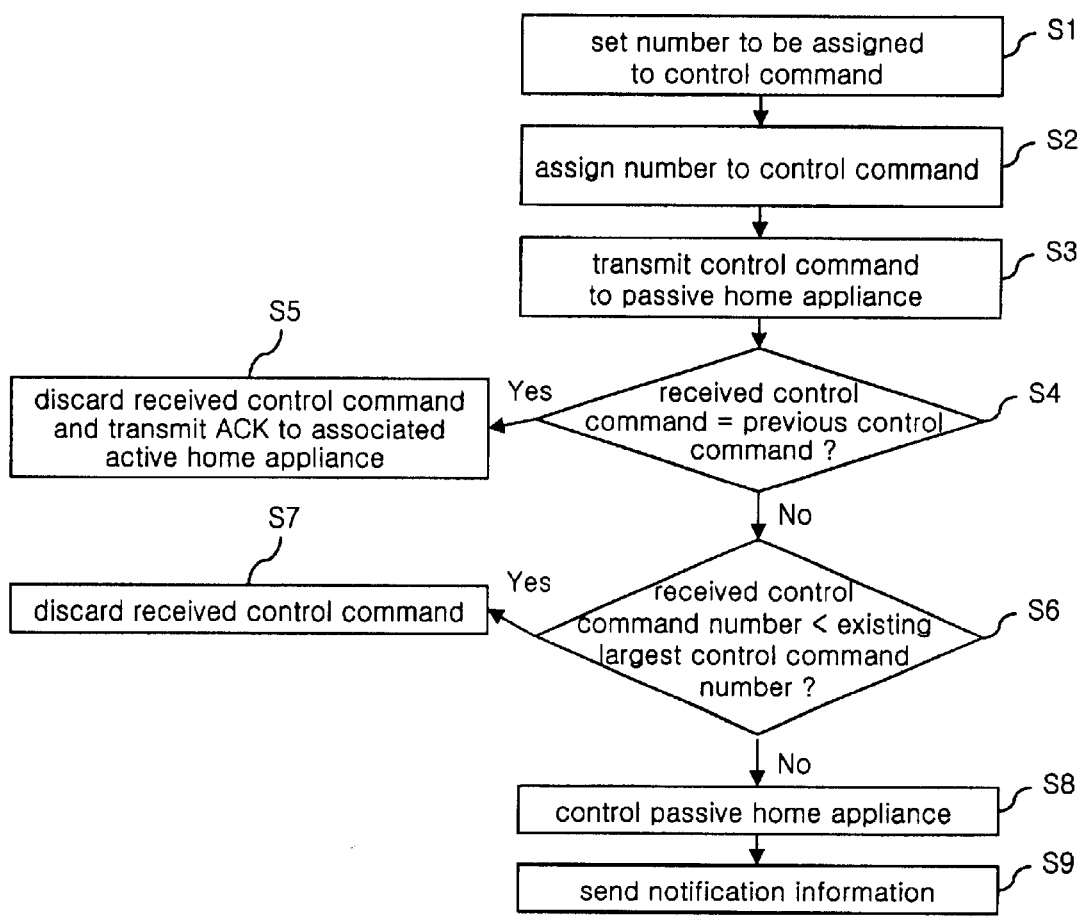
FIG. 4 is a flow chart illustrating a home appliance networking system control method in accordance with the present invention.

FIG. 4 is a flow chart illustrating a home appliance networking system control method in accordance with the present invention.

At the first step S1, an active home appliance capable of transmitting a control command input by a user to a passive home appliance connected to an internal network sets a number to be assigned to the control command. At this time, the active home appliance initially transmits a number request command to the passive home appliance and sets the number to be assigned to the control command on the basis of a number transmitted from the passive home appliance. Alternatively, in the case where there is an existing number assigned to the control command, the active home appliance may set the number to be assigned to the control command to a value obtained by adding '1' to the existing number upon receiving notification information transmitted from the passive home appliance over the internal network.

At the second step S2, the active home appliance assigns the number set at the first step S1 to the control command input by the user.

At the third step S3, the active home appliance transmits the control command assigned the set number at the second step S2 to the passive home appliance.

Upon receiving the control command transmitted from the active home appliance, the passive home appliance determines at the fourth step S4 whether the received control command is the same as a previous control command.

If the received control command is determined to be the same as the previous control command at the fourth step S4, the passive home appliance discards the received control command and transmits an acknowledgement signal ACK to the active home appliance associated with the received control command at the fifth step S5.

On the other hand, upon determining at the above fourth step S4 that the received control command is not the same as the previous control command, the passive home appliance compares the number assigned to the received control command with an existing largest control command number at the sixth step S6.

In the case where the number assigned to the received control command is smaller than the existing largest control command number at the sixth step S6, the passive home appliance discards the received control command at the seventh step S7.

On the contrary, if the number assigned to the received control command is larger than the existing largest control command number at the above sixth step S6, the passive home appliance is controlled according to the received control command at the eighth step S8.

At the ninth step S9, the passive home appliance sends notification information to the internal network to notify the internal network that it has been controlled according to the control command transmitted at the above third step S3. At this time, the notification information includes a number obtained by adding '1' to the number assigned to the control command transmitted at the above third step S3. As a result, upon receiving the notification information sent from the passive home appliance, a plurality of active home appliances can recognize the number of the current control command by which the passive home appliance has been controlled.

As is apparent from the above description, the present invention provides a home appliance networking system and a method for controlling the same. The home appliance networking system comprises a plurality of passive home appliances controlled according to control commands sent over an internal network constructed for a home networking system, and a plurality of active home appliances for transmitting the control commands for the passive home appliances to the internal network. The plurality of active home appliances transmit different control commands assigned their unique numbers to a specific one of the plurality of passive home appliances. The specific passive home appliance is controlled according to only a latest input one of the input control commands. Therefore, even though a user inputs control commands through the plurality of active home appliances, the corresponding passive home appliance can be prevented from being erroneously controlled.

In the present specification "home appliance" as used is not limited to a home appliance but is used only as an example of a machine, a device or a system etc. Also, "home" as used is not limited to such a home but is used as an example of a home, a school, an office, or a factory, etc. Further, plural buildings are also included in the term "home".

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in priority Application No. 2002-0015043, filed on Mar. 20, 2002, which is herein expressly incorporated by reference in its entirety.

What is claimed is:

1. A home appliance networking system comprising:
   at least one passive home appliance that identifies a number assigned to a control command received over an internal network of a home networking system, said passive home appliance being controlled according to the received control command on the basis of the identified number and then sending notification information to said internal network to notify said internal network that said passive home appliance has been controlled according to said control command; and
   at least one active home appliance that increases a number to be assigned to a control command to be transmitted to said passive home appliance in response to said notification information sent from said passive home appliance, assigns the increased number to said control command to be transmitted to said passive home appliance and transmits the resulting control command to said passive home appliance.

2. The home appliance networking system as set forth in claim 1, wherein said passive home appliance comprises:
   a number identification unit that identifies a number assigned to a current control command currently sent over said internal network;
   a number memory that stores a largest one of numbers assigned to a plurality of control commands previously sent over said internal network; and
   a controller that controls said passive home appliance in response to said current control command if said number identified by said number identification unit is larger than the number stored in said number memory, and then stores said number assigned to said current control command in said number memory.

3. The home appliance networking system as set forth in claim 2, wherein said controller of said passive home appliance further transmits an acknowledgement signal to an active home appliance associated with said current control command after controlling said passive home appliance in response to said current control command.

4. The home appliance networking system as set forth in claim 2, wherein said controller of said passive home appliance further sends notification information to said internal network to notify that said passive home appliance has been controlled according to said current control command.

5. The home appliance networking system as set forth in claim 1, wherein said active home appliance includes:
   a number memory that stores a number to be assigned to a control command input by a user; and
   a controller that increases said number stored in said number memory upon receiving said notification information sent from said passive home appliance, and then assigns the increased number to the input control command and transmits the resulting control command to said passive home appliance.

6. The home appliance networking system as set forth in claim 5, wherein said controller of said active home appliance transmits a number request command to said passive home appliance to request sending of a number stored in a number memory of said passive home appliance.

7. The home appliance networking system as set forth in claim 6, wherein said controller of said passive home appliance sends said number stored in said number memory of said passive home appliance to said active home appliance in response to said number request command.

8. The home appliance networking system as set forth in claim 2, wherein said passive home appliance further comprises a control command memory for storing a control command sent over said internal network.

9. The home appliance networking system as set forth in claim 8, wherein said controller of said passive home appliance further determines whether said current control command is the same as a control command stored in said control command memory, and then transmits an acknowledgement signal to an active home appliance associated with said current control command if said current control command is the same as the control command stored in said control command memory.

10. The home appliance networking system as set forth in claim 2, wherein said number identification unit identifies a number by analyzing a header of a data packet of each of said control commands.

11. The home appliance networking system as set forth in claim 10, wherein said header contains any one of numbers 1 to 254.

12. A method for controlling a home appliance networking system, comprising:
   assigning, by an active home appliance, a number to a home appliance control command to be sent to an internal network of a home networking system;
   sending, by said active home appliance, said control command assigned said number to said internal network;
   controlling a passive home appliance according to the sent control command to identify said number assigned to the sent control command;
   determining, by said passive home appliance, based upon said identified number, whether said passive home appliance will be controlled according to said sent control command;
   controlling said passive home appliance according to said sent control command if it is determined that said passive home appliance will be controlled according to said sent control command;
   sending, by said passive home appliance, notification information to said internal network to notify said internal network that said passive home appliance has been controlled according to said sent control command; and
   increasing, by said active home appliance, said number assigned to said control command upon receiving said notification information.

13. The method as set forth in claim 12, wherein the determination comprises:

identifying, by said passive home appliance, said number assigned to said sent control command;

comparing, by said passive home appliance, said identified number with an existing control command number stored therein; and determining, by said passive home appliance, that said passive home appliance will be controlled according to said sent control command, if said identified number is larger than said existing control command number.

14. The method as set forth in claim 13, wherein said determination further comprises:

storing, by said passive home appliance, said identified number if said identified number is larger than said existing control command number; and comparing, by said passive home appliance, a number assigned to a control command sent after said identified number is stored, with the stored number.

15. The method as set forth in claim 12, further comprising:

determining, by said passive home appliance, whether said sent control command is the same as a previous control command before performing the determination; and not controlling said passive home appliance according to said sent control command if it is determined that said sent control command is the same as said previous control command.

* * * * *

UNITED STATES PATENT AND TRADEMARK OFFICE
CERTIFICATE OF CORRECTION

PATENT NO.    : 6,633,781 B1
DATED         : October 14, 2003
INVENTOR(S)   : S. Lee et al.

It is certified that error appears in the above-identified patent and that said Letters Patent is hereby corrected as shown below:

Title page,
Item [30], Foreign Application Priority Data, should be included:
-- Korean Application No. 2002-15043, filed March 20, 2002 --

Signed and Sealed this

Eighth Day of June, 2004

JON W. DUDAS
*Acting Director of the United States Patent and Trademark Office*